(12) United States Patent
Lee

(10) Patent No.: US 7,235,340 B2
(45) Date of Patent: Jun. 26, 2007

(54) METHOD OF PRODUCING A TOUCH PANEL (75) Inventor: Hsin-Hung Lee, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 623 days.

(21) Appl. No.: 10/708,376

(22) Filed: Feb. 27, 2004

(65) Prior Publication Data

US 2004/0234901 A1    Nov. 25, 2004

(30) Foreign Application Priority Data

May 23, 2003    (TW) .............................. 92114002 A (51) Int. Cl.
*G09G 5/00* (2006.01)

(52) U.S. Cl. .................. 430/139; 430/319; 430/321; 345/175; 345/179; 345/182; 445/24; 427/64; 427/162; 427/165

(58) Field of Classification Search .................. None
See application file for complete search history.

(56) References Cited

U.S. PATENT DOCUMENTS

2003/0197690 A1 * 10/2003 Zimenkov .................... 345/179
2004/0227734 A1 * 11/2004 Chang et al. ................ 345/168

FOREIGN PATENT DOCUMENTS

JP    1-021520 A    *    1/1989

* cited by examiner

*Primary Examiner*—John A McPherson
(74) *Attorney, Agent, or Firm*—Winston Hsu (57) ABSTRACT

First a display panel having a pixel region and a controlling circuit region is formed. Then a plurality of pixels arranged in array is formed in the pixel region. A plurality of orientation patterns that do not overlap the pixels is formed. Finally an input device is provided. The input device has a sensor for detecting the orientation patterns and generates at least a signal for inputting data.

9 Claims, 10 Drawing Sheets

METHOD OF PRODUCING A TOUCH PANEL

BACKGROUND OF INVENTION

1. Field of the Invention

The present invention relates to a method of producing a touch panel, and more particularly, to a method of forming a plurality of orientation patterns on a display panel.

2. Description of the Prior Art

Since portable information products, such as PDAs, mobile phones, notebooks, and tablet PCs are more and more prevailing, touch panels are broadly applied to these products as an input interface. Especially when requirements of tablet PCs rise, the touch panel becomes one of the most important components because it integrates the input functions with the output functions in the same interface (display).

Figure 1:
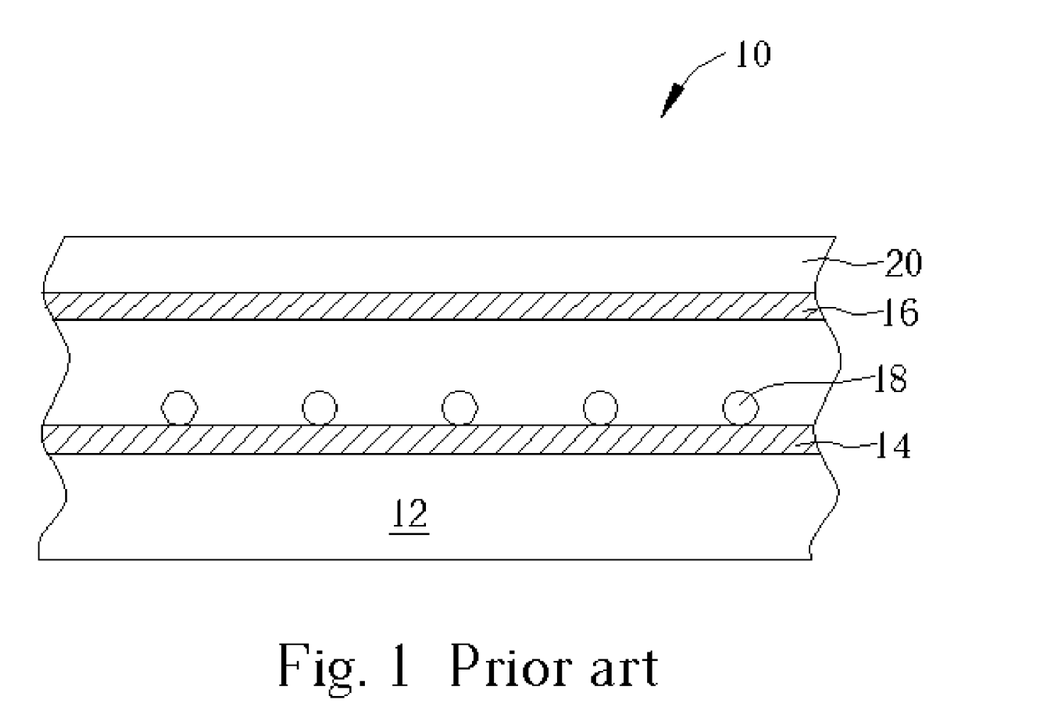
FIG. 1 is a schematic diagram of a prior art resistance type touch panel.

Touch panels are mainly classified into four types: resistance type, capacitor type, supersonic type, and optic type, wherein the resistance type touch panel is most widely used because of its lower cost and thinner thickness. Refer to FIG. 1, which is a schematic diagram of a prior art resistance type touch panel 10. As shown in FIG. 1, the prior art resistance type touch panel 10 includes an ITO glass 12, a bottom ITO film 14, a top ITO film 16, a plurality of dot spacers 18 arranged in an array between the bottom ITO film 14 and the top ITO film 16, and a PET (polyethylene terephthalate) layer 20. The resistance type touch panel 10 is positioned on a display panel (not shown). When a user uses an input tool (such as finger or pen) to press the PET layer 20, corresponding voltages will be generated between the top ITO film 16 and the bottom ITO film 14 via the dot spacers 18. Then coordinates of the input tool tracks will be generated and transferred to a processor (not shown) via conductive wires (not shown) laid under the bottom ITO film 14. Finally corresponding signals will be generated and transferred to the display panel.

Although resistance type touch panels are most widely used so far, the resistance type touch panel has some shortcomings, such as poor aperture ratio, low durability, and poor input accuracy. Among all the above-mentioned problems, the input accuracy is a critical issue for users to consider when choosing a touch panel. When a user uses a pen to write data on the touch panel, the pen tip will naturally leave the surface of the touch panel. This action reduces the pressure applied to the resistance type touch panel and further reduces the corresponding voltages, such that input errors will happen. Furthermore, the users palm will easily contact the touch panel when writing data, and this would also generate input errors. In addition, the resistance type touch panel is assembled by glue, thus the border area of the touch panel is full of glue. This makes the user have to depress the touch panel harder to input data in the border area than in the central area.

SUMMARY OF INVENTION

It is therefore an object of the present invention to provide a method of producing a touch panel to solve the above-mentioned problems.

The present invention provides a method of producing a touch panel. The method includes: providing a display panel having a pixel region and a controlling circuit region; forming a plurality of pixels arranged in an array in the pixel region for displaying images; forming a plurality of orientation patterns in the pixel region for designating coordinates of the pixel region; and providing an input device for inputting data; wherein the input device includes a sensor for detecting orientation patterns, and the orientation patterns are fluorescent patterns or magnetic patterns.

It is an advantage of the present invention that a sensor is employed to detect the orientation patterns, such that the coordinates of the input points are accurately recognized. In addition, the orientation patterns do not overlap the pixels, thus the poor aperture ratio problem of the prior art resistance type touch panel is avoided.

These and other objects of the present invention will be apparent to those of ordinary skill in the art after having read the following detailed description of the preferred embodiment that is illustrated in the various figures and drawings.

DETAILED DESCRIPTION

Figure 2:
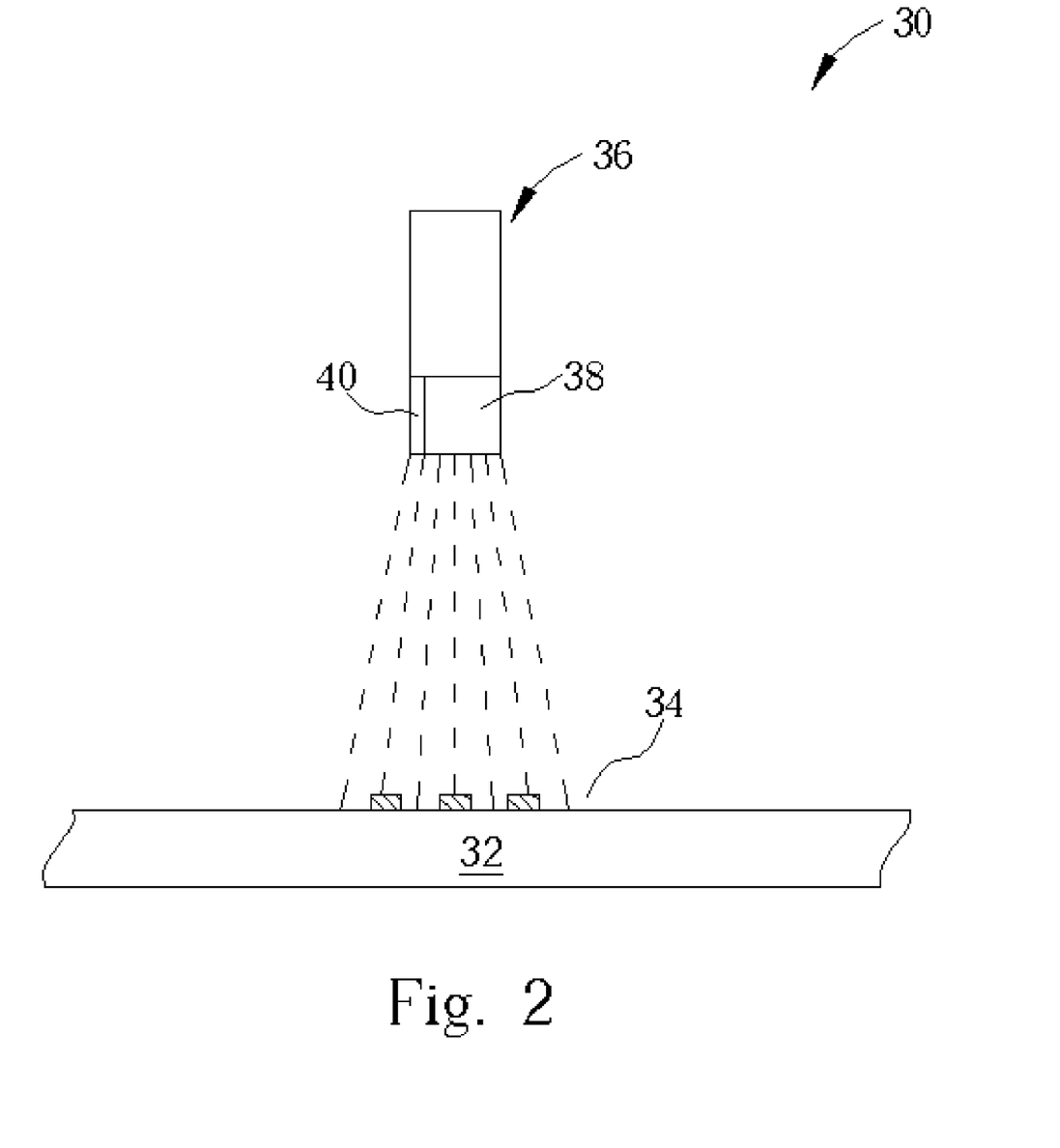
FIG. 2 is a schematic diagram of a touch panel of the present invention.

Refer to FIG. 2, which is a schematic diagram of a touch panel 30 of the present invention. As shown in FIG. 2, the touch panel 30 includes a display panel 32, a plurality of orientation patterns 34, and an input device 36. The display panel 32 further includes a pixel region (not shown) and a controlling circuit region (not shown). The pixel region includes a plurality of pixels arranged in an array for displaying images. The controlling region includes a controlling circuit for driving the pixels. The display panel 32 is a flat display panel, such as an LCD panel, a top emission OLED display panel, a bottom emission ILED display panel, a plasma display panel, or a non-flat display panel. The input device 36 has a sensor including a light emitting element 38 and a light sensor 40.

In the present invention, the light emitting element 38, such as an LED, is used for emitting a light with a specific wavelength to the orientation patterns 34, and the light sensor 40, such as a charged-couple device (CCD), is used for detecting and receiving coordinates representing the orientation patterns 34. Therefore when a user uses the input device 36 to input data, the light sensor 40 will receive the coordinates of the tracks, generate at least a corresponding signal, and transfer the signal to the display panel 32 via a processor (not shown).

Figure 3:
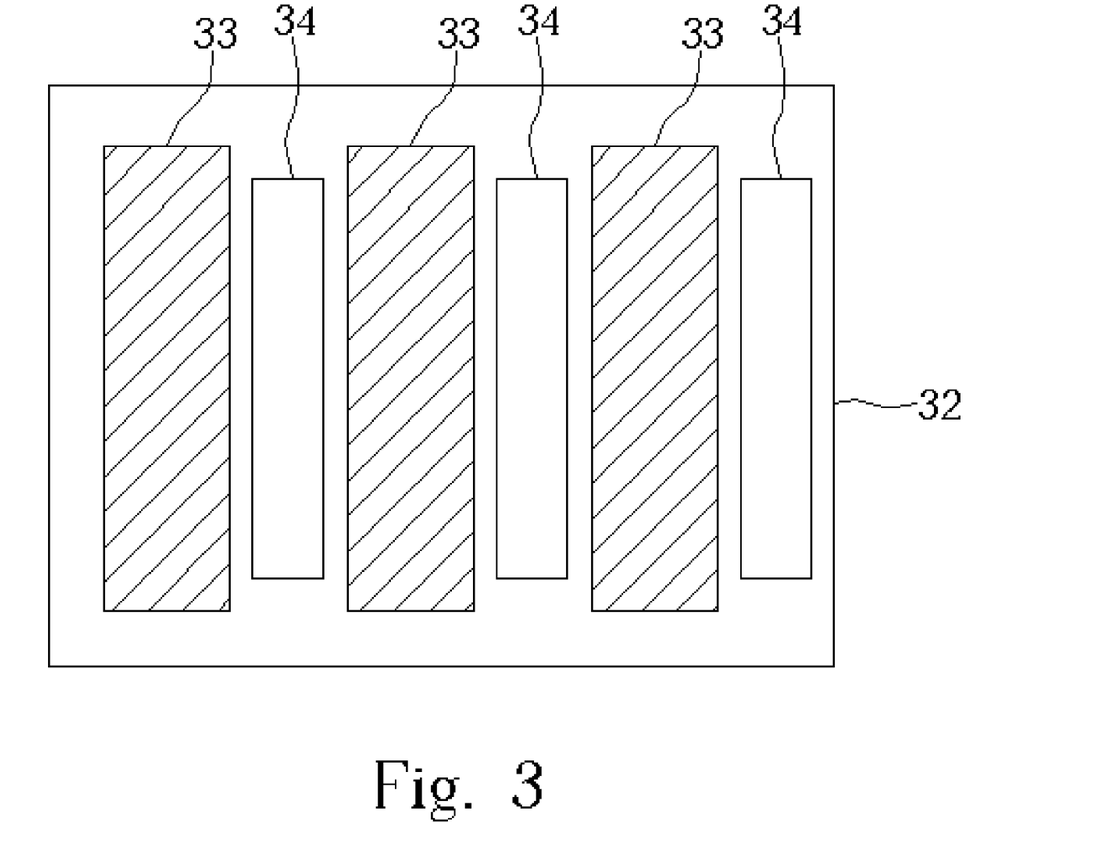
FIG. 3 is a top view of the touch panel illustrated in FIG. 2.

Refer to FIG. 3, which is a top view of the touch panel 32 shown in FIG. 2. As shown in FIG. 3, the orientation patterns 34 are positioned on the display panel 32 but do not overlap the pixels 33, thus the aperture ratio is not reduced. It is worth noticing that the orientation patterns 34 are composed of fluorescent inks including anthracene or aromatic compounds, thus the orientation patterns 34 are not visible unless the input device 36 irradiates a light with a specific wavelength to the orientation patterns 34. Alternatively, the orientation patterns 34 can be composed of magnetic inks. In this case, a magnetic sensor must replace the sensor of the input device 36 for detecting the orientation patterns 34 and generating corresponding signals.

Figure 4:
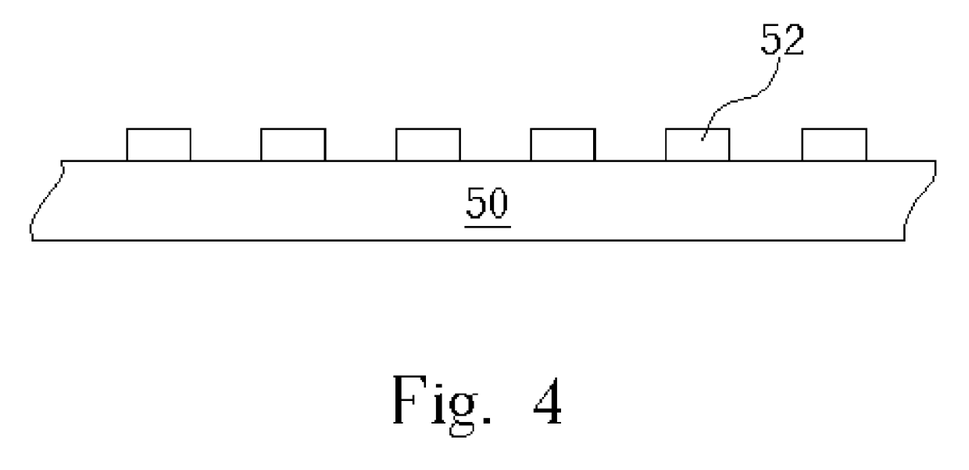
FIGS. 4-6 are schematic diagrams illustrating a method of producing the touch panel according to the first embodiment of the present invention.
Figure 5:
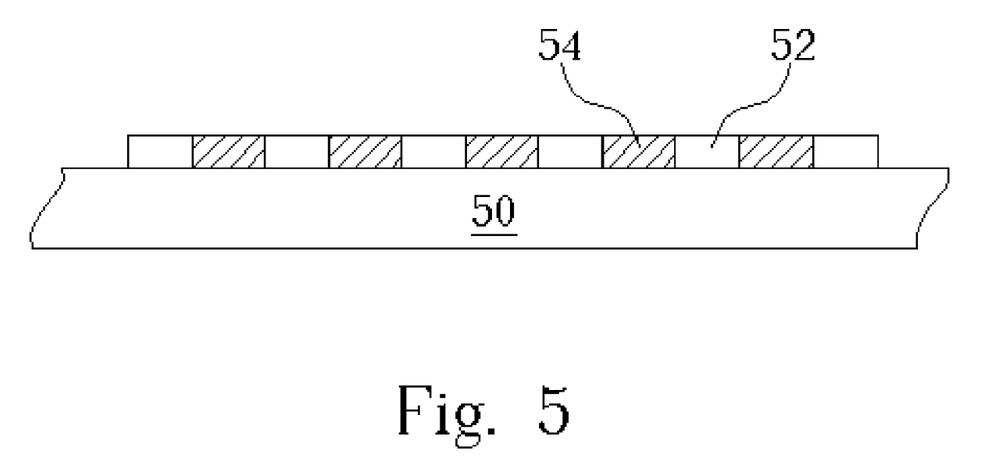
Figure 6:
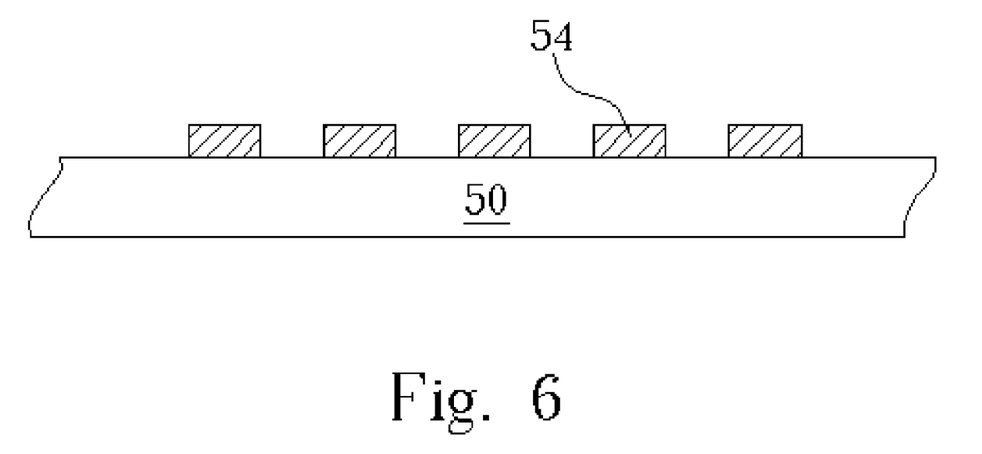

Refer to FIGS. 4-6, which are schematic diagrams illustrating a method of producing the touch panel according to the first embodiment of the present invention. As shown in FIG. 4, a display panel 50 is provided, and a halftone 52 is positioned on the display panel 50. As shown in FIG. 5, then a chemical aid 54 is coated on the halftone 52 to form the orientation patterns. Finally as shown in FIG. 6, the halftone 52 is removed to accomplish the touch panel of the present invention.

Figure 7:
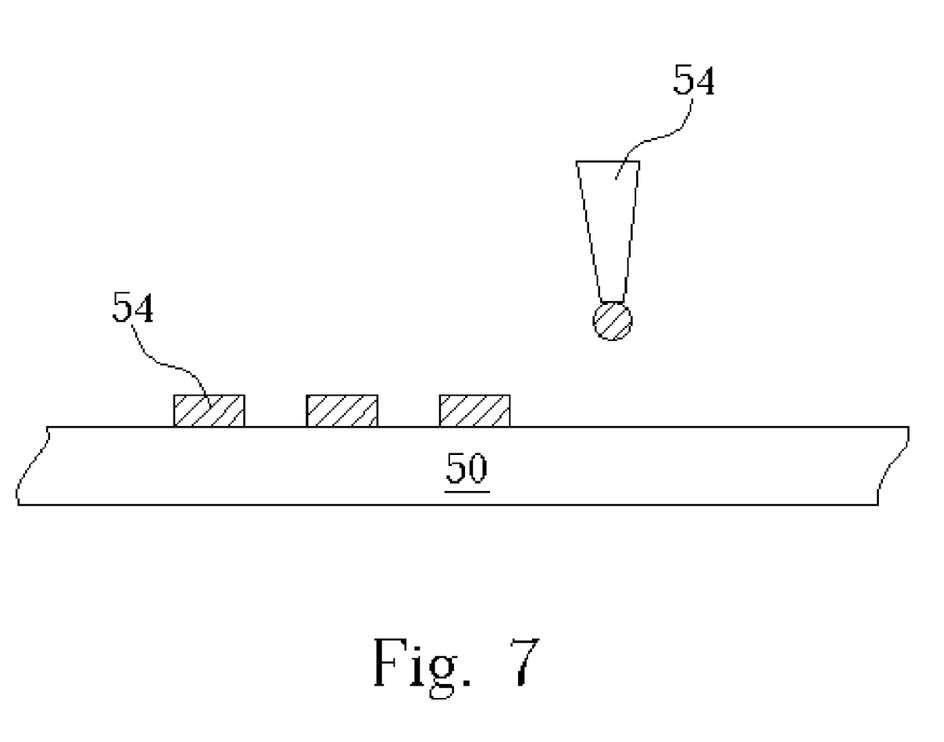
FIG. 7 is a schematic diagram illustrating a method of producing the touch panel according to the second embodiment.

Refer to FIG. 7, which is a schematic diagram illustrating a method of producing the touch panel according to the second embodiment. As shown in FIG. 7, first a display panel 50 is provided, and then an ink jet head 60 is employed to spray the chemical aid 54 on the display panel for forming the orientation patterns. The chemical aid 54 is a fluorescent ink, a magnetic ink, or a solution including fluorescent or magnetic substances.

Figure 8:
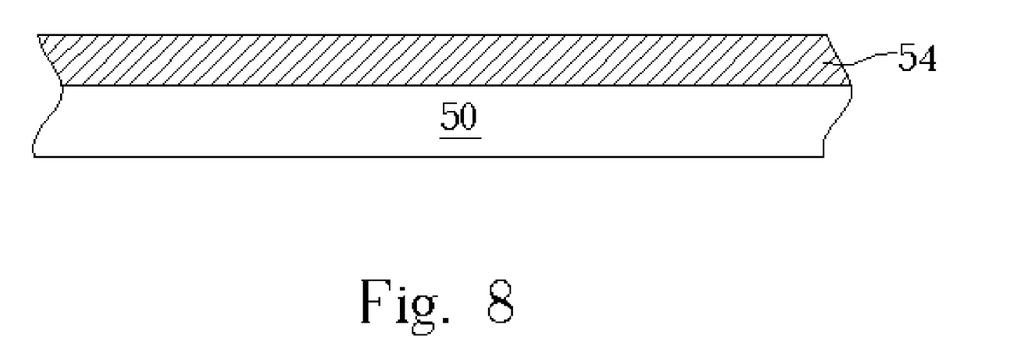
FIGS. 8-10 are schematic diagrams illustrating a method of producing the touch panel according to the third embodiment.
Figure 9:
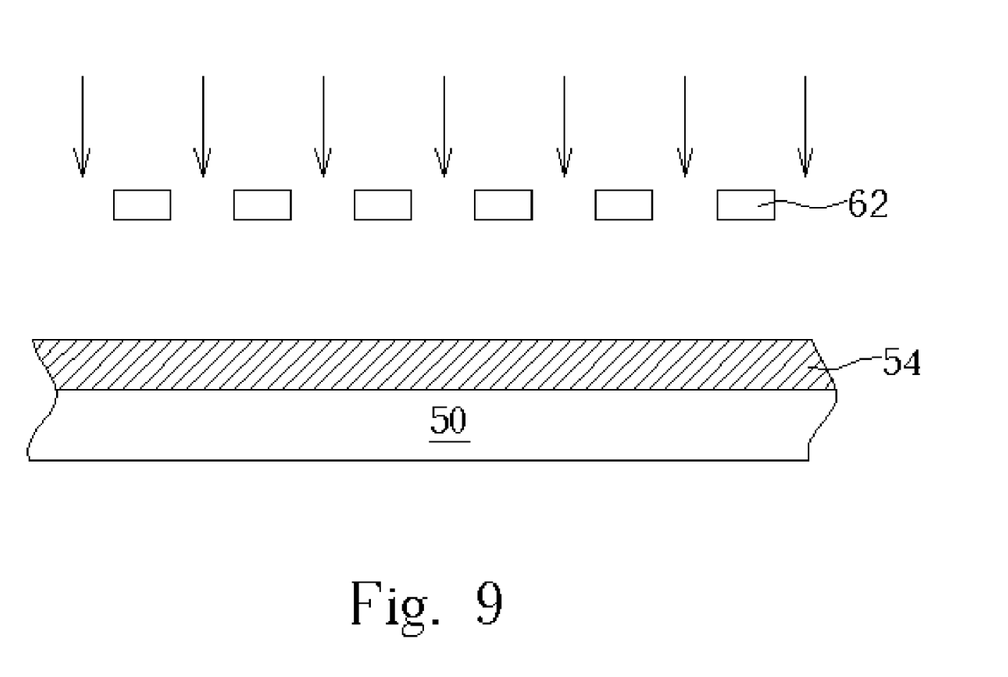
Figure 10:
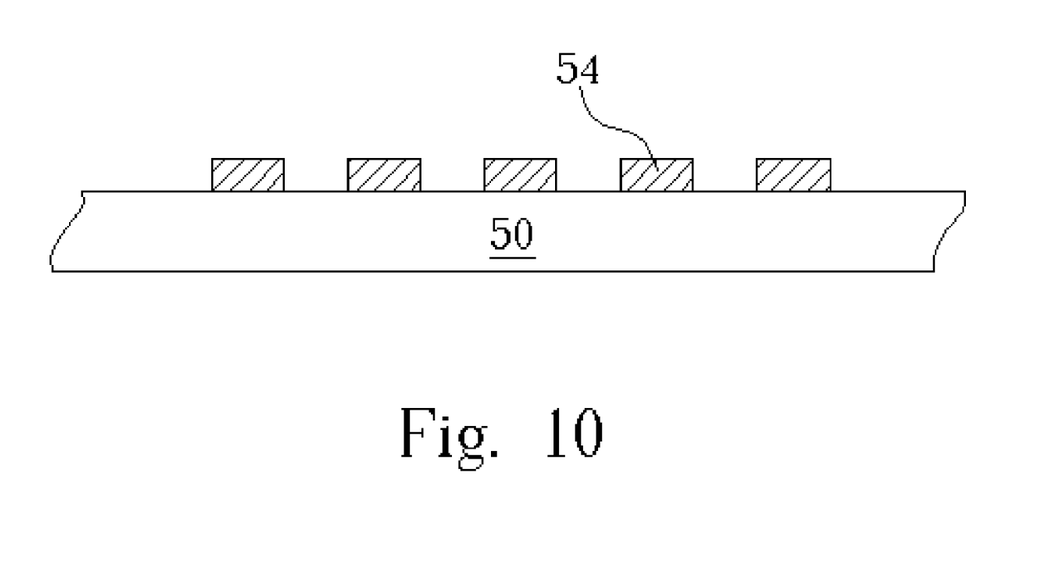

Refer to FIGS. 8-10, which are schematic diagrams illustrating a method of producing the touch panel according to the third embodiment. As shown in FIG. 8, a display panel 50 is provided, and a chemical aid 54 is coated on the display panel 50 to form a photosensitive film. The photosensitive film is composed of photosensitive fluorescent ink or photosensitive magnetic ink, and formed by spin coating or blade coating. As shown in FIG. 9, a photolithography process is performed by a mask 62 to transfer the orientation patterns on the display panel 50. As shown in FIG. 10, finally a development process is performed to remove excessive chemical aid 54. It is worth noticing that if the orientation patterns are composed of non-photosensitive magnetic ink, then a photo resist layer must be deposited on the display panel 50 before the photolithography process to transfer the orientation patterns.

In summary, the method of the present invention forms a plurality of orientation patterns which do not overlap the pixel region of the display panel, and utilizes the sensor of the input device to receive the coordinates representing the orientation patterns, thus the aperture ratio of the display panel is remained. Furthermore, the sensor of the input device 36 can be a photosensitive sensor, a magnetic sensor, an electronic sensor, or other type sensors. The data of the orientation patterns 34 representing different coordinates can be stored in the processor or the display panel. However, that is not the scope of the present invention, thus unnecessary detail is not disclosed here.

In addition, the orientation patterns can be formed in different type display panels, such as an LCD panel or OLED display panel. Also, the orientation patterns are not limited to be formed on the surface of the display panel. For example, if an LCD display is used, the orientation patterns can be formed on the surface of the LCD panel, or between the top substrate and the black matrix layer. If a top emission OLED display panel is used, the orientation patterns can be formed on the top surface of the glass container or on the bottom surface of the glass container. If a bottom emission OLED display panel is used, the orientation patterns can be formed on the bottom surface of the bottom substrate or between the thin film transistors and the bottom substrate.

Comparing to the prior art, the present invention forms a plurality of orientation patterns on the display panel which do not overlap the pixels, and utilizes the sensor of the input device to detect and receive the orientation patterns. Therefore, the input accuracy is improved while the aperture ratio is remained.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A method of producing a touch panel comprising:
   providing a display panel which comprises a pixel region and a controlling circuit region;
   forming a plurality of pixels arranged in an array in the pixel region for displaying images;
   forming a plurality of fluorescent patterns not overlapping the pixels in the pixel region for designating coordinates of the pixel region; and
   providing an input device for inputting data, the input device comprising:
   a light emitting element for revealing the fluorescent patterns; and
   a light sensor for detecting the fluorescent patterns.

2. The method of claim 1, wherein the light emitting element is capable of generating a light with a specific wavelength for revealing the fluorescent patterns, and the light sensor is capable of identifying coordinates of the fluorescent patterns and generating corresponding signals.

3. The method of claim 1, wherein the fluorescent patterns are composed of fluorescent inks comprising anthracene or aromatic compounds.

4. The method of claim 1, wherein the fluorescent patterns are formed by halftone printing or ink jet printing.

5. The method of claim 1, wherein forming the fluorescent patterns further comprises:
   forming a photosensitive film on the display panel;
   performing an exposure process by a mask; and
   performing a development process to form a plurality of fluorescent patterns not overlapping the pixels;
   wherein the photosensitive film is a photosensitive ink, and the photosensitive film is formed by spin coating or blade coating.

6. The method of claim 1, wherein the display panel is an LCD panel, and the fluorescent patterns are formed on a top substrate surface of the LCD panel or between the top substrate and a black matrix layer.

7. The method of claim 1, wherein the display is a top emission OLED display panel having a glass container, and the fluorescent patterns are positioned on a top surface of the glass container or on a bottom surface of the glass container.

8. The method of claim 1, wherein the display panel is a bottom emission OLED display panel having a bottom substrate and a plurality of thin film transistors, and the fluorescent patterns are positioned on a bottom surface of the bottom substrate or between the bottom substrate and the thin film transistors.

9. The method of claim 1, wherein the controlling circuit region further comprises a controlling circuit for driving the pixels, and the touch panel further comprises a processor for receiving the signals from the light sensor and driving the controlling circuit to display tracks of the input device.

* * * * *